United States Patent
Binder et al.

(10) Patent No.: US 7,363,315 B2
(45) Date of Patent: Apr. 22, 2008

(54) CREATING, EDITING, AND DISPLAYING HIERARCHICAL DATA STRUCTURES ASSOCIATED WITH DATA IN A DATA SOURCE

(75) Inventors: Claudia P. Binder, Walldorf (DE); Andreas Deutesfeld, Altlussheim (DE); Thomas Göring, Wiesloch (DE); Gerhard Weigelt, Roemerberg (DE); Vladislav Bezrukov, Sandhausen (DE)

(73) Assignee: SAP AG (DE)

( * ) Notice: Subject to any disclaimer, the term of this patent is extended or adjusted under 35 U.S.C. 154(b) by 312 days.

(21) Appl. No.: 11/062,524

(22) Filed: Feb. 22, 2005

(65) Prior Publication Data

US 2006/0190844 A1    Aug. 24, 2006

(51) Int. Cl.
*G06F 7/00* (2006.01)
(52) U.S. Cl. .................. 707/102; 715/506; 715/513; 715/515; 715/516; 715/517; 715/518; 715/519; 715/520; 715/521; 715/522; 715/523; 715/524; 715/525; 715/530
(58) Field of Classification Search ............ 707/103 R
See application file for complete search history.

(56) References Cited

U.S. PATENT DOCUMENTS

| | | | |
|---|---|---|---|
| 6,668,354 B1 * | 12/2003 | Chen et al. ............. | 715/517 |
| 7,168,035 B1 * | 1/2007 | Bell et al. .............. | 715/513 |
| 2001/0037338 A1 * | 11/2001 | Stockley ................ | 707/101 |
| 2002/0026461 A1 * | 2/2002 | Kutay et al. ........... | 707/523 |
| 2003/0227487 A1 * | 12/2003 | Hugh .................... | 345/777 |
| 2004/0189716 A1 * | 9/2004 | Paoli et al. ............ | 345/853 |
| 2005/0183007 A1 * | 8/2005 | Gaug et al. ............ | 715/513 |

* cited by examiner

*Primary Examiner*—Christian Chace
*Assistant Examiner*—Aaron Sanders
(74) *Attorney, Agent, or Firm*—Fountainhead Law Group P.C.

(57) ABSTRACT

Methods and systems, including computer program products, implementing techniques for configuring data structures. The techniques include receiving a description of a logical structure of a data model, the logical structure comprising a first set of elements; displaying a first display structure in a graphical user interface (GUI), the first display structure being a graphical representation of the description of the logical structure, the first display structure comprising visual representations of the elements of the logical structure; generating a data structure based on one or more user-selected visual representations of the elements of the logical structure, the data structure comprising a second set of elements; and displaying a second display structure in the GUI, the second display structure being a graphical representation of the data structure, the second display structure comprising visual representations of the elements of the data structure.

18 Claims, 4 Drawing Sheets

CREATING, EDITING, AND DISPLAYING HIERARCHICAL DATA STRUCTURES ASSOCIATED WITH DATA IN A DATA SOURCE

BACKGROUND

The present invention provides methods and apparatus, including computer program products, for configuring data structures.

Many business processes use forms as their final output (e.g., order confirmation). Sometimes, different business scenarios within an area of an enterprise use forms having some overlap of concepts and data structures (e.g., order confirmation, quotation, and order inquiry). Conventional forms generation systems require an application programmer to provide, for each form, a data retrieval program that retrieves data from a data source in a particular order for subsequent insertion into the form.

SUMMARY

The present invention provides methods and apparatus, including computer program products, implementing techniques for configuring data structures.

In one aspect, the techniques include receiving a description of a logical structure of a data model, the logical structure comprising a first set of elements; displaying a first display structure in a graphical user interface (GUI), the first display structure being a graphical representation of the description of the logical structure, the first display structure comprising visual representations of the elements of the logical structure; generating a data structure based on one or more user-selected visual representations of the elements of the logical structure, the data structure comprising a second set of elements; and displaying a second display structure in the GUI, the second display structure being a graphical representation of the data structure, the second display structure comprising visual representations of the elements of the data structure.

Implementations of the invention can include one or more of the following features. The techniques can further include receiving from a user an input action that selects one or more visual representations of the elements of the logical structure. The user input action can include a drag-and-drop operation. Each element can include a data type characteristic. An element having a complex data type characteristic can include one or more sub-elements or one or more attributes. An element having a simple data type characteristic can include one or more attributes. The second set of elements can be a subset or superset of the first set of elements.

The techniques can further include receiving from a user an input action that identifies an element of the data structure; redefining the data structure based on the user-identified element; and altering, in the second display structure, the visual representation of the user-identified element based on the redefined data structure.

The techniques for altering the visual representation of the user-identified element can include removing the visual representation of the user-identified element from the second display structure or applying an indicia to the visual representation of the user-identified element.

The techniques for redefining the data structure based on the user-identified element can include modifying a relationship between the user-identified element and another element in the second set of elements; and altering the visual representation of the user-identified element comprises moving the visual representation of the user-identified element to a different location in the second display structure.

The techniques for redefining the data structure based on the user-identified element can include applying a control level to the user-identified element; and altering the visual representation of the user-identified element comprises providing the user-identified element as part of a hierarchical structure within the second display structure.

The techniques can further include receiving from a user an input action that identifies an enhancement module to be added to the data structure; and redefining the data structure based on the user-identified enhancement module, the redefined data structure comprising the enhancement module for use in enhancing data at run-time.

The techniques can further include generating a description of the data structure according to a schema. The description of data structure can be an eXtensible Markup Language (XML) document. The techniques can further include providing data from a data retrieval program or a data source according to the data structure.

Advantages that can be seen in particular implementations of the invention include one or more of the following. The systems and techniques simplify the forms generation process. Some implementations allow forms developers to generate a context object having a particular data structure through simple operations such as drag-and-drop. Forms developers can thus avoid having to generate context objects manually, which can be a tedious, time-consuming, and error-prone task. Forms developers can also build complex context objects without having detailed knowledge about the underlying concepts. Context objects stored in an information repository provide a simplified and re-usable way for different users to embed or otherwise use data from a data source according to a data structure specified by a context object. A single data retrieval program utilizing the context objects can retrieve data for multiple different forms. The systems and techniques provide different users with an easy-to-use approach to modify, customize and extend data output through use of a context object. One implementation includes all of the foregoing advantages.

The details of one or more examples are set forth in the accompanying drawings and the description below. Further features, aspects, and advantages of the invention will become apparent from the description, the drawings, and the claims.

DESCRIPTION OF DRAWINGS

Like reference numbers and designations in the various drawings indicate like elements.

DETAILED DESCRIPTION

Figure 1:
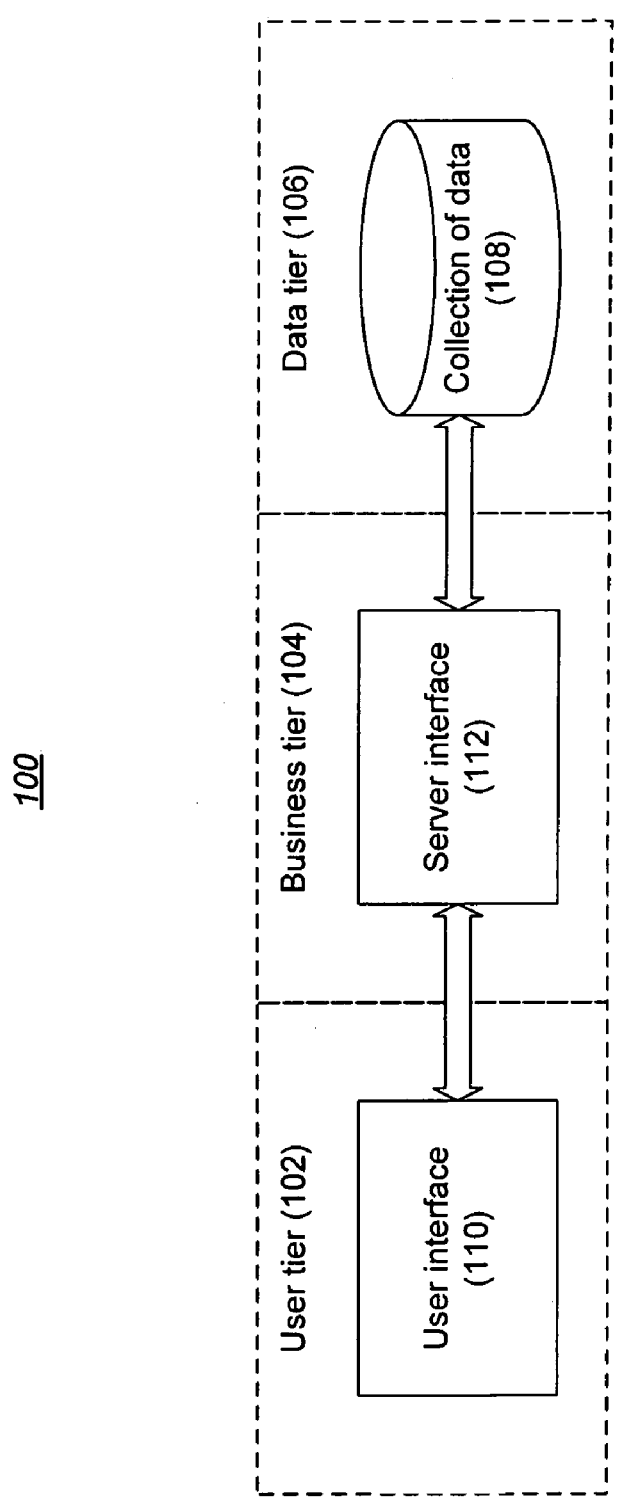
FIG. 1. is a block diagram of an example logical representation of a business software architecture.

As shown in FIG. 1, an overview logical representation of a business software architecture 100 includes a user tier 102, a business tier 104, and a data tier 106. The data tier 106 includes a collection of data 108. The collection of data 108 can be associated with different back end applications (not shown) and/or can be arranged and formatted differently from each other. The user tier 102 provides a user interface 110 that enables a user to interact with the collection of data 108 via the business tier 104. The business tier 104 provides a server interface 112 to the collection of data 108, which enables the user tier 102 to interact with the collection of data 108 in a consistent fashion, regardless of the formatting or application-associated differences between the collection of data 108. By configuring the user tier 102 to interact with the server interface 112 of the business tier 104 (rather than directly with the collection of data 108), the user tier 102 need only be updated if the server interface 112 to the collection of data 108 changes. Changes to the collection of data 108 do not necessitate an update the user tier 102. The server interface 112 of the business tier 104 is scalable and configured to handle changes and growth to the collection of data 108.

Figure 2:
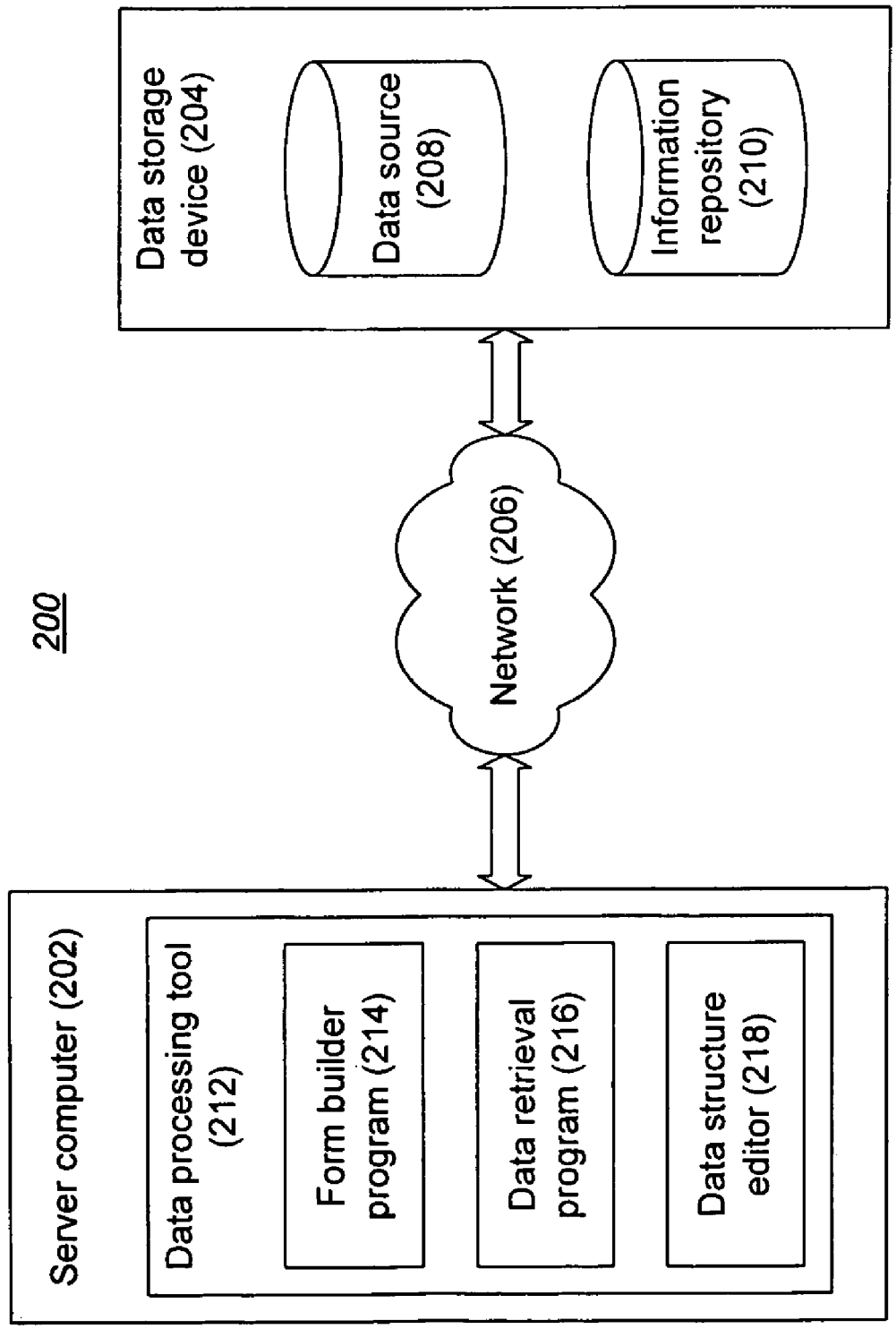
FIG. 2 is a view of a system configuration for a business software architecture.

FIG. 2 shows a system 200 providing one implementation of the business software architecture 100 of FIG. 1. As shown in FIG. 2, the system 200 includes a server computer 202 and a data storage device 204 in communication via a network 206. The network 206 is any form or medium of digital data communication (e.g., a communication network). Examples of the network 206 include a local area network ("LAN") and a wide area network ("WAN"), such as the Internet.

The data storage device 204 includes a data source 208 and an information repository 210. The data source 208 contains a collection of data for an enterprise. The collection of data can be structured in a number of alternative ways, such as a relational database, a distributed database, an object-oriented database, an XML schema, an XML data file, or a Web service. In one implementation, the data in the collection is arranged into logical, organized groups of objects (referred to as "logical structures") that can easily be maintained. Typically, a logical structure is associated with a specific area (e.g., a Web sales area) of the enterprise. Each logical structure both specifies a set of elements (e.g., tables, structures, and fields) and the relationships that exist between the elements that may be required by a number of business scenarios (e.g., order confirmations and invoices) specific to an area of the enterprise.

Each element has a number of characteristics, including a data type characteristic. An element having a complex data type characteristic includes one or more sub-elements or one or more attributes. Examples of such an element include structures containing fields, substructures or subtables, and tables containing fields, substructures, or subtables. An element having a simple data type characteristic includes one or more attributes. Examples of such an element include single fields and fields.

A description of each logical structure is stored in the information repository 210 as an interface object. Each interface object provides a re-usable and simplified way for data to be retrieved from the data source 208 according to the logical structure set forth in the interface object.

The server computer 202 includes a processor, a random access memory (RAM), a program memory (for example, a writable read-only memory (ROM) such as a flash ROM), a hard drive controller, a video controller, and an input/output (I/O) controller coupled by a processor (CPU) bus. The server computer 202 can be preprogrammed, in ROM, for example, or programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs to accomplish implementations operations, and data. The I/O controller is coupled by an I/O bus to an I/O interface. The I/O interface receives and transmits data in analog or digital form over communication links (e.g., a serial link, local area network, wireless link, or parallel link). Also coupled to the I/O bus are a display and a keyboard. In other implementations, separate links (e.g., separate buses) can be used for the I/O interface, display, and keyboard.

In one particular example, the server computer 202 includes a data processing tool 212 for generating forms for various business scenarios of the enterprise. The data processing tool 212 includes a form builder program 214, a data retrieval program 216, and a data structure editor 218. Examples of forms that may be generated by the data processing tool 212 for different business scenarios of the enterprise include order confirmations, invoices, account statements, checks, salary statements, and so forth.

Each form is associated with a form layout and a context object. The form layout defines (among other things) the position and appearance of data on a page. The context object includes elements and the relationships between these elements. The context object specifies the structure and flow of data from the data source 208 to the data processing tool 212 for insertion into the form according to the form layout at run-time. For example, if the data structure of the context object includes two instances of <table element A> separated by a <structure element B>, the order in which data is retrieved by the data retrieval program 216 and made available to the form builder program 214 at run-time is as follows: data for <table element A>; data for <structure element B>; and data for <table element A>. Context objects stored in the information repository 210 provide a re-usable way for different users to embed or otherwise use data from the data source 208 according to the data structure set forth in the context object.

Creating a context object at design-time can be difficult and time-consuming, especially if the context object to be generated has a complex data structure (e.g., a deeply nested data structure with many levels of elements and attributes). Moreover, specifying relationships between the elements can be a difficult process for a user who does not have detailed knowledge about the underlying concepts.

A data structure editor 218 can be used to facilitate the building of context objects. The data structure editor 218 can be used to generate a new context object by copying the logical structure of an existing interface object, and adapting the logical structure to generate a customized data structure that satisfies the requirements of a form for a particular business scenario.

Figure 3:
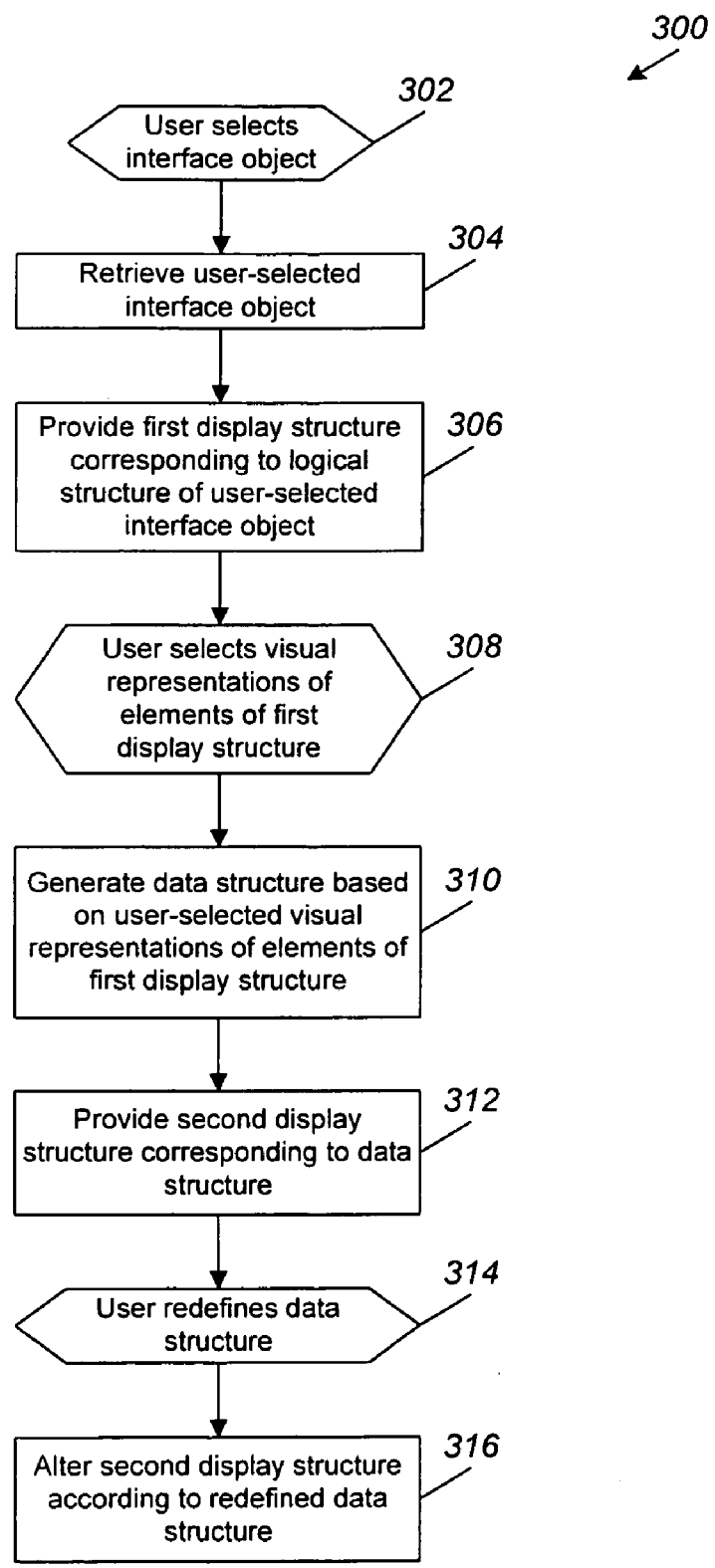
FIG. 3 is a flowchart of a process for generating a context object.
Figure 4:
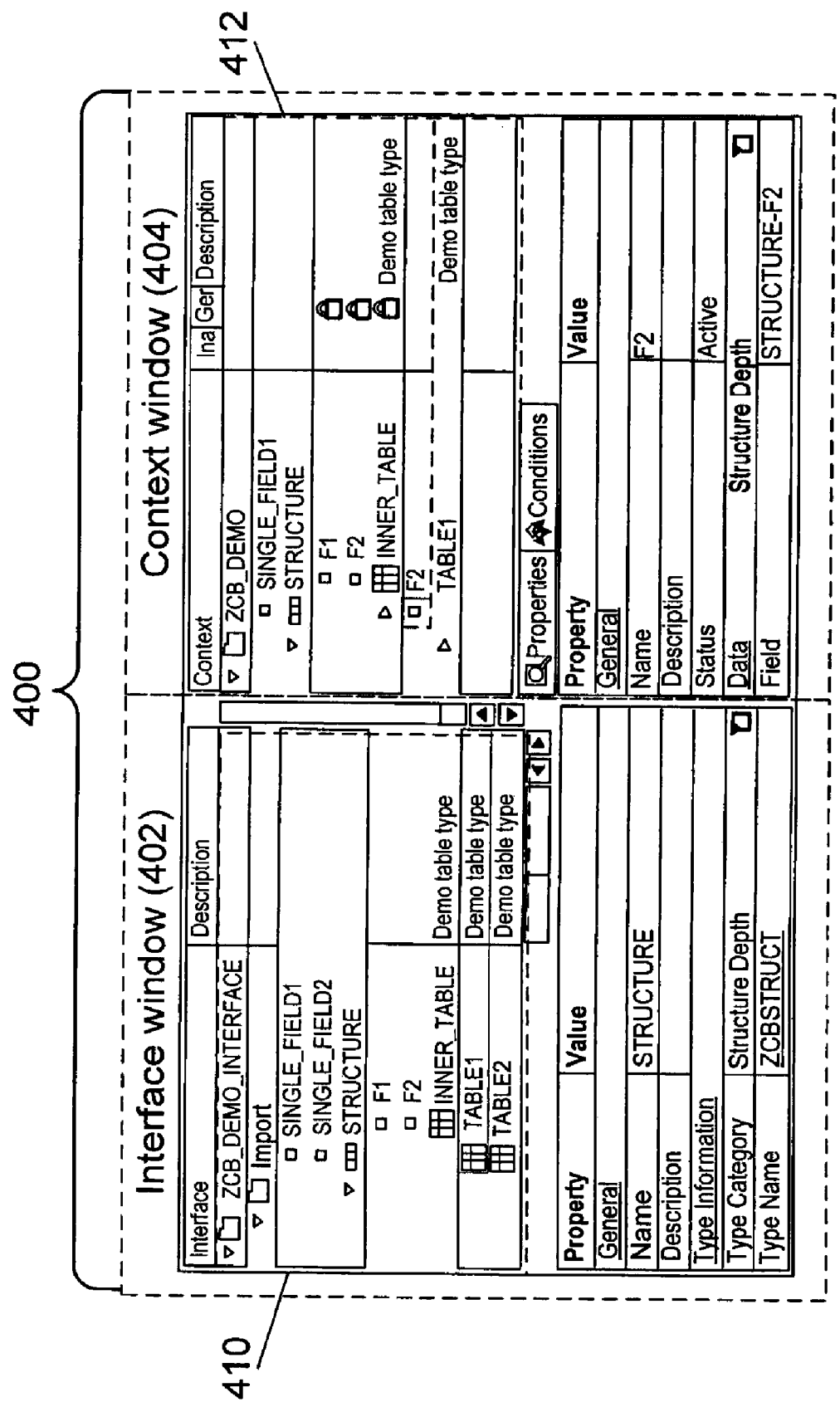
FIG. 4 is a screenshot of a graphical user interface.

FIG. 3 is a flowchart of a process 300 suitable for implementation in the data structure editor 218 for generating a context object. The data structure editor 218 provides a graphical user interface ("GUI") that is displayed on a monitor in communication with the server computer 202, either directly or via a client computer. The GUI 400 includes an "interface" window 402 and a "context" window 404 as shown in FIG. 4. Through the GUI 400, the user selects (302) an interface object, stored in the information repository 210, having a logical structure that is to be used as a starting point of a context object generating operation. The data structure editor 218 retrieves (304) or otherwise receives the user-selected interface object from the information repository 210 and provides (306) a first display structure 410 in the "interface" window 402 of the GUI 400. The first display structure 410 is a graphical representation of the description of the logical structure provided by the user-selected interface object. As shown in FIG. 4, the first display structure 410 includes visual representations of the elements (and relationships between elements) of the logical structure.

The data structure editor 218 receives (308) from the user an input action that selects one or more of the visual representations of the elements of the logical structure. The data structure editor 218 generates (310) a data structure based on the one or more user-selected visual representations of the elements of the logical structure. In one example, the user input action involves a conventional drag-and-drop operation, in which the user drags a visual representation of a logical structure element from the "interface" window 402 to the "context" window 404. If the user drags and drops an attribute, only the attribute is generated in the new data structure. If the user drags and drops an element, the element and all of its sub-elements and attributes are generated in the new data structure with a single drag-and-drop operation. In so doing, the data structure editor 218 tool can be used to generate a duplicate of a logical structure or a portion of the logical structure as desired.

In one implementation, the default operation of the data structure editor 218 is to generate a graphical representation of the data structure (also referred to as the "second display structure" 412) in real-time and provide (312) the second display structure 412 in the "context" window 404 of the GUI 400, as shown in FIG. 4. The second display structure 412 includes visual representations of the elements of the newly-generated data structure.

The user can redefine (314) the data structure by renaming, adding and/or removing elements of the data structure. In this manner, the elements of the data structure may be a subset or a superset of the elements of the logical structure. As the data structure is redefined by the user, the data structure editor 218 alters (316) the second display structure 412 in real-time. For example, in the scenario in which the user identifies an element of the data structure for removal, the data structure editor 218 can either remove the visual representation of the user-identified element from the second display structure 412, or apply a visual indicia (e.g., graying out or providing a "X" mark) to the visual representation of the user-identified element in the second display structure 412.

The elements that are added to the data structure can be elements of the logical structure or enhancement-type elements (also referred to as "enhancement modules") that are predefined reusable components stored in the information repository. Examples of enhancement modules include text modules, address modules, and image modules. In one example, the user adds an address module to the data structure. At run-time, when forms are printed for end-users in different countries, country- or language-specific information can be merged using the address module. For example, the ZIP code of an address can be automatically placed in the appropriate position of a form when a "SAP Business Address Services" address module, available from SAP AG of Walldorf (Baden), Germany, is included in the data structure.

The user can also redefine the data structure by restructuring the relationships between elements of the data structure. Examples of ways in which the relationships between elements can be restructured include: (1) reordering and/or arranging the elements of the data structure (i.e., to have a different order of elements as compared to the logical structure) as desired; (2) grouping elements into folders if the form builder program 214 requires data to be provided in levels; (3) nesting elements that are at the same level in the logical structure; and (4) applying control levels to elements to effect a hierarchical structure of elements within the data structure.

Once the user is satisfied with the data structure, the user can click on a "Finish" button displayed on the GUI 400 to complete the context object generating operation. In one implementation, the user input action causes the data structure editor 218 to store the context object in the information repository 210 for subsequent use. In another implementation, the user input action causes the data processing tool 212 to utilize conventional techniques for generating a description of the data structure according to a schema, e.g., the eXtensible Markup Language (XML) schema. The description of the data structure can then be stored in the information repository 210 as an XML document or provided to other systems and/or programs.

Although the context objects are described in terms of a forms generation example, the context objects can be used in other scenarios in which data is retrieved from a data source for further processing. The context objects can be used by the system 200 to facilitate pure data exchange with a second different system (not shown) that subsequently processes the data by, e.g., updating its database.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. Other embodiments are within the scope of the following claims

The invention claimed is:

1. A system comprising:
a server computer and a data storage device, the server computer having a form builder program, a data retrieval program, and a data structure editor running on the server computer, the data storage device storing a data source and an information repository, wherein:
the data source comprises a collection of data arranged into one or more logical structures, each of the one or more logical structures specifying a set of elements, each element having a data type characteristic and a relationship with one or more other elements as specified by the logical structure;
the information repository stores context object data structures and descriptions of the logical structures of the collections of data in the data source for use by the data structure editor;
the data structure editor is operable to interact with a user using a graphical user interface (GUI) to derive a first context object data structure from a first description of a logical structure of the collection of data in the data source, wherein:
the data structure editor copies in response to user actions one or more elements specified by the first description of the logical structure to the first context object data structure; and
the first context object data structure specifies a flow of data from the data source to one or more elements of the first context object data structure, each element having a data type characteristic and a relationship with one or more other elements of the first context object data structure as specified by the first context object data structure;
the data retrieval program is operable to retrieve data from the data source as specified by context object data structures, each context object data structure specifying the structure and flow of data from the data source to a corresponding form; and
the form builder program is operable to receive data from the data retrieval program to populate a first form according to a layout, the data being populated in the order specified by a context object data structure corresponding to the first form, the layout defining the position and appearance of data on the first form.

2. The system of claim 1 wherein the data structure editor is operable to add enhancement-type elements to a first context object data structure, the enhancement-type elements comprising predefined reusable components stored in the information repository.

3. The system of claim 1 wherein the data structure editor is operable to derive a first context object data structure comprising elements that are a subset of the elements specified by a first description of a logical structure of a collection of data in the data source.

4. The system of claim 1 wherein the data structure editor is operable to derive a first context object data structure comprising elements that are a superset of the elements specified by a first description of a logical structure of a collection of data in the data source.

5. The system of claim 1 wherein one or more elements specified by the first description of the logical structure further comprise:
one or more sub-elements or one or more attributes.

6. The system of claim 1 wherein one or more elements of the first context object data structure further comprise:
one or more sub-elements or one or more attributes.

7. A method comprising:
arranging a collection of data in a data source into one or more logical structures, each of the one or more logical structures specifying a set of elements, each element having a data type characteristic and a relationship with one or more other elements as specified by the logical structure;
storing context object data structures and descriptions of the logical structures of the collections of data in the data source for use by the data structure editor in an information repository;
interacting with a user using a graphical user interface (GUI) of a data structure editor to derive a first context object data structure from a first description of a logical structure of the collection of data in the data source, wherein:

the data structure editor copies in response to user actions one or more elements specified by the first description of the logical structure to the first context object data structure; and the first context object data structure specifies a flow of data from the data source to one or more elements of the first context object data structure, each element having a data type characteristic and a relationship with one or more other elements of the first context object data structure as specified by the first context object data structure;

retrieving data from the data source as specified by context object data structures, each context object data structure specifying to a data retrieval program the structure and flow of data from the data source to a corresponding form; and receiving data from the data retrieval program in a form builder program to populate a first form according to a layout, the data being populated in the order specified by a context object data structure corresponding to the first form, the layout defining the position and appearance of data on the first form.

8. The method of claim 7 wherein the data structure editor is operable to add enhancement-type elements to a first context object data structure, the enhancement-type elements comprising predefined reusable components stored in the information repository.

9. The method of claim 7 wherein the data structure editor is operable to derive a first context object data structure comprising elements that are a subset of the elements specified by a first description of a logical structure of a collection of data in the data source.

10. The method of claim 7 wherein the data structure editor is operable to derive a first context object data structure comprising elements that are a superset of the elements specified by a first description of a logical structure of a collection of data in the data source.

11. The method of claim 7 wherein one or more elements specified by the first description of the logical structure further comprise:

one or more sub-elements or one or more attributes.

12. The method of claim 7 wherein one or more elements of the first context object data structure further comprise:

one or more sub-elements or one or more attributes.

13. A computer program product, tangibly embodied in a machine-readable storage device, comprising instructions operable to cause data processing apparatus to:

arrange a collection of data in a data source into one or more logical structures, each of the one or more logical structures specifying a set of elements, each element having a data type characteristic and a relationship with one or more other elements as specified by the logical structure;

store context object data structures and descriptions of the logical structures of the collections of data in the data source for use by the data structure editor in an information repository;

interact with a user using a graphical user interface (GUI) of a data structure editor to derive a first context object data structure from a first description of a logical structure of the collection of data in the data source, wherein:

the data structure editor copies in response to user actions one or more elements specified by the first description of the logical structure to the first context object data structure; and the first context object data structure specifies a flow of data from the data source to one or more elements of the first context object data structure, each element having a data type characteristic and a relationship with one or more other elements of the first context object data structure as specified by the first context object data structure;

retrieve data from the data source as specified by context object data structures, each context object data structure specifying to a data retrieval program the structure and flow of data from the data source to a corresponding form; and receive data from the data retrieval program in a form builder program to populate a first form according to a layout, the data being populated in the order specified by a context object data structure corresponding to the first form, the layout defining the position and appearance of data on the first form.

14. The product of claim 13 wherein the data structure editor is operable to add enhancement-type elements to a first context object data structure, the enhancement-type elements comprising predefined reusable components stored in the information repository.

15. The product of claim 13 wherein the data structure editor is operable to derive a first context object data structure comprising elements that are a subset of the elements specified by a first description of a logical structure of a collection of data in the data source.

16. The product of claim 13 wherein the data structure editor is operable to derive a first context object data structure comprising elements that are a superset of the elements specified by a first description of a logical structure of a collection of data in the data source.

17. The product of claim 13 wherein one or more elements specified by the first description of the logical structure further comprise:

one or more sub-elements or one or more attributes.

18. The product of claim 13 wherein one or more elements of the first context object data structure further comprise:

one or more sub-elements or one or more attributes.

* * * * *